(12) United States Patent
Kosuda et al.

(10) Patent No.: US 7,704,635 B2
(45) Date of Patent: Apr. 27, 2010

(54) ELECTROCHEMICAL DEVICE AND METHOD OF MANUFACTURING ELECTROCHEMICAL DEVICE

(75) Inventors: Atsuko Kosuda, Tokyo (JP); Keita Kobayashi, Tokyo (JP); Satoshi Maruyama, Tokyo (JP)

(73) Assignee: TDK Corporation, Tokyo (JP)

( * ) Notice: Subject to any disclaimer, the term of this patent is extended or adjusted under 35 U.S.C. 154(b) by 1443 days.

(21) Appl. No.: 11/065,454

(22) Filed: Feb. 25, 2005

(65) Prior Publication Data

US 2005/0186468 A1 Aug. 25, 2005

(30) Foreign Application Priority Data

Feb. 25, 2004 (JP) ............................ P2004-050352

(51) Int. Cl.
*H01M 2/18* (2006.01)
(52) U.S. Cl. ...................................... 429/130; 429/162
(58) Field of Classification Search ................. 429/130, 429/129, 148, 161, 181, 246, 162; 29/623.5, 29/623.2

See application file for complete search history.

(56) References Cited

U.S. PATENT DOCUMENTS

| | | | | |
|---|---|---|---|---|
| 6,344,292 | B1 * | 2/2002 | Nemoto et al. | 429/56 |
| 2003/0165735 | A1 * | 9/2003 | Nobuta et al. | 429/153 |
| 2005/0221173 | A1 * | 10/2005 | Tatebayashi et al. | 429/161 |

FOREIGN PATENT DOCUMENTS

| | | |
|---|---|---|
| JP | U-60-151126 | 10/1985 |
| JP | B2-3008399 | 12/1999 |
| JP | A-2001-351831 | 12/2001 |

* cited by examiner

*Primary Examiner*—Patrick Ryan
*Assistant Examiner*—Monique Wills
(74) *Attorney, Agent, or Firm*—Oliff & Berridge, PLC

(57) ABSTRACT

An electrochemical device comprises a laminate including a first electrode layer, a separator layer, and a second electrode layer laminated in sequence; an electrolytic solution infiltrating the laminate; and a resin part covering an outer periphery of the laminate. The second electrode layer has an area smaller than the area of the separator layer and the area of the first electrode layer. The surface of the separator layer opposing the second electrode layer is provided with a noncontact part kept away from the second electrode layer. The noncontact part is formed like a ring along the outer periphery of the separator layer. The resin part further covers the noncontact part of the separator layer.

7 Claims, 12 Drawing Sheets

Fig.12

| | ANODE SIZE | CATHODE SIZE | SEPARATOR SIZE | IMPEDANCE ($\Omega$) | | |
| --- | --- | --- | --- | --- | --- | --- |
| | | | | INITIAL | AFTER 24 HR | AFTER 168 HR |
| EXAMPLE1 | 7.1×7.1mm | 7.2×7.2mm | 7.2×7.2mm | 3.50 | 3.55 | 3.70 |
| EXAMPLE2 | 19.5×24.5mm | 20.0×25.0mm | 20.0×25.0mm | 0.60 | 0.76 | 1.47 |
| COMPARATIVE EXAMPLE1 | 7.1×7.1mm | 7.2×7.2mm | 7.2×7.2mm | 3.65 | 3.76 | 4.20 |
| COMPARATIVE EXAMPLE2 | 19.5×24.5mm | 20.0×25.0mm | 20.0×25.0mm | 0.67 | 0.95 | 2.12 |

ELECTROCHEMICAL DEVICE AND METHOD OF MANUFACTURING ELECTROCHEMICAL DEVICE

BACKGROUND OF THE INVENTION

1. Field of the Invention

The present invention relates to an electrochemical device and a method of manufacturing an electrochemical device.

2. Related Background Art

Electrochemical devices such as electrochemical capacitors like electric double layer capacitors and batteries like lithium-ion secondary batteries are those which can easily reduce their size and weight, and thus are expected to become power supplies or backup power supplies for portable devices (small-size electronic devices) and auxiliary power supplies for electric cars or hybrid cars, for example.

Each of these electrochemical devices comprises a laminate in which a first electrode layer, a separator layer, and a second electrode layer are successively laminated; an electrolytic solution infiltrated into the laminate, and a package accommodating the laminate (see, for example, Japanese Patent Publication No. 3008399).

SUMMARY OF THE INVENTION

Recently, such an electrochemical device has been required to restrain the opposing area of the first and second electrode layers from fluctuating because of their positional deviations.

For suppressing the fluctuation in the opposing area of the electrodes due to their positional deviations, the area of one electrode layer may be made smaller than the area of the other, such that the whole main surface of the smaller electrode layer always opposes the main surface of the larger electrode layer, thereby reducing the fluctuation. In this case, the area of the separator is made greater than the area of the smaller electrode layer in order to prevent the electrode layers from short-circuiting.

However, the surface of the separator coming into contact with the electrode layer having a smaller area in such an electrochemical device yields a noncontact part which does not come into contact with the electrode layer. It has been found that, when such an electrochemical device is exposed to a high temperature and the like, the electrolytic solution is likely to evaporate/disperse from the noncontact part of the separator in particular, so that there are cases where the electrolytic solution is in short, and so forth, whereby heat resistance deteriorates.

In view of the problem mentioned above, it is an object of the present invention to provide an electrochemical device in which fluctuations in the electrode opposing area are small, while heat resistance is high; and a method of manufacturing the same.

The present invention provides an electrochemical device comprising a laminate including a first electrode layer, a separator layer, and a second electrode layer laminated in sequence; an electrolytic solution infiltrating the laminate; and a resin part covering an outer periphery of the laminate; wherein the second electrode layer has an area smaller than the area of the separator layer and the area of the first electrode layer, the surface of the separator layer opposing the second electrode layer being provided with a noncontact part kept away from the second electrode layer, the noncontact part being formed like a ring along the outer periphery of the separator layer; and wherein the resin part further covers the noncontact part of the separator layer.

Since the area of the second electrode layer is smaller than that of the first electrode layer, the electrode opposing area is stably kept at the area of the first electrode layer even when these electrode layers slightly shift their relative positions in a direction orthogonal to the laminating direction in the electrochemical device in accordance with the present invention.

Since the outer periphery of the laminate including the first electrode layer, second electrode layer, and separator layer and the noncontact part in the surface of the separator layer are covered and sealed with the resin part, on the other hand, the electrolytic solution is harder to evaporate/disperse from the outer periphery of the laminate and, in particular, the noncontact part of the separator layer, even when exposed to a high temperature, whereby heat resistance improves.

Since the resin part covers not only the outer periphery of the separator layer, but also the noncontact part of the separator layer, the bonding strength between the resin part and the separator layer increases, thereby improving the mechanical strength of the electrochemical device.

Preferably, each of the first and second electrode layers is a polarizable electrode layer. In this case, an electrode double layer capacitor is obtained favorably. An example of the polarizable electrode is a porous body containing a carbon material.

Preferably, the laminate is constructed by successively laminating a collector layer, a first electrode layer, a separator layer, a second electrode layer, and a collector layer.

Since the first electrode layer, separator layer, and second electrode layer are sealed with the collector layers and the resin part, the dissipation of the electrolytic solution due to its evaporation becomes smaller.

Preferably, the electrochemical device further comprises a pair of terminal plates holding therebetween the laminate and the resin part in a laminating direction of the laminate, one terminal plate being electrically connected to the first electrode layer and bonded to the resin part, the other terminal plate being electrically connected to the second electrode layer and bonded to the resin part.

The electrochemical device may further comprise a can accommodating the laminate and resin part in a closed state, the can including two members made of a metal electrically insulated from each other, one member being electrically connected to the first electrode layer, the other member being electrically connected to the second electrode layer.

The electrochemical device may further comprise a bag accommodating the laminate and resin part in a closed state; a first lead, electrically connected to the first electrode layer of the laminate, projecting out from within the bag; and a second lead, electrically connected to the second electrode layer of the laminate, projecting out from within the bag; the bag being formed from a film constituted by a metal foil having a surface laminated with a resin.

In these cases, it becomes easier for the electrochemical device to electrically connect with the outside. When closed in a bag or can, the evaporation and dissipation of the electrolytic solution are further reduced.

It will be preferred if the resin part is formed from a thermoplastic resin, since the resin part is easily formed thereby.

The present invention provides a method of manufacturing an electrochemical device comprising the steps of yielding a laminate including a first electrode layer, a separator layer, and a second electrode layer laminated in sequence; impregnating the laminate with an electrolytic solution; and covering an outer periphery of the laminate with a resin. In the step of yielding the laminate, the second electrode layer is made to have an area smaller than the area of the separator layer and the area of the first electrode layer, and a noncontact part kept away from the second electrode layer is formed like a ring along the outer periphery of the separator layer on the surface of the separator layer opposing the second electrode layer.

This method can favorably manufacture the above-mentioned electrochemical device.

Preferably, in the step of covering the outer periphery of the laminate with the resin, a sealant made of a thermoplastic resin is mounted on the noncontact part of the separator, and then the sealant is heated while being pressed against the separator layer. The sealant has a ring-like form. An inner periphery of the sealant surrounds the outer periphery of the second electrode layer while the sealant projects beyond a top face of the laminate in a state where the sealant is mounted on the noncontact part.

This can easily yield a resin layer favorably in close contact with an end face of the laminate and the noncontact part of the separator layer.

Preferably, the outer periphery of the sealant projects out of the outer periphery of the first electrode layer in the state where the sealant is mounted on the noncontact part in the step of covering the outer periphery of the laminate with the resin.

In this case, a resin part having a sufficient radial thickness can be formed on the outer periphery of the laminate, which improves the sealability.

In the step of covering the outer periphery of the laminate with the resin, the laminate and the sealant may be held between a pair of terminal plates, and the sealant may be heated while one terminal plate is pressed against the other terminal plate.

In this case, the providing of the collector layer with a terminal plate for an external terminal and the forming of the resin part covering the outer periphery of the laminate and the noncontact part can be performed at the same time, which reduces the number of steps.

Preferably, the sealant contains polypropylene, whereas its heating temperature is 140° to 200° C. Heating the sealant at such a relatively low temperature makes the laminate less likely to be adversely affected thereby.

The present invention provides an electrochemical device in which fluctuations of the electrode opposing area are small while heat resistance is high; and a method of manufacturing the same.

BRIEF DESCRIPTION OF THE DRAWINGS

FIG. 12 is a table showing impedance values of the electric double layer capacitors of Examples 1 and 2 and Comparative Examples 1 and 2.

DESCRIPTION OF THE PREFERRED EMBODIMENTS

In the following, preferred embodiments of the electrochemical device of the present invention being employed in an electric double layer capacitor will be explained in detail with reference to the drawings. In the following explanation, parts identical or equivalent to each other will be referred to with numerals identical to each other without repeating their overlapping descriptions.

First Embodiment

Figure 1:
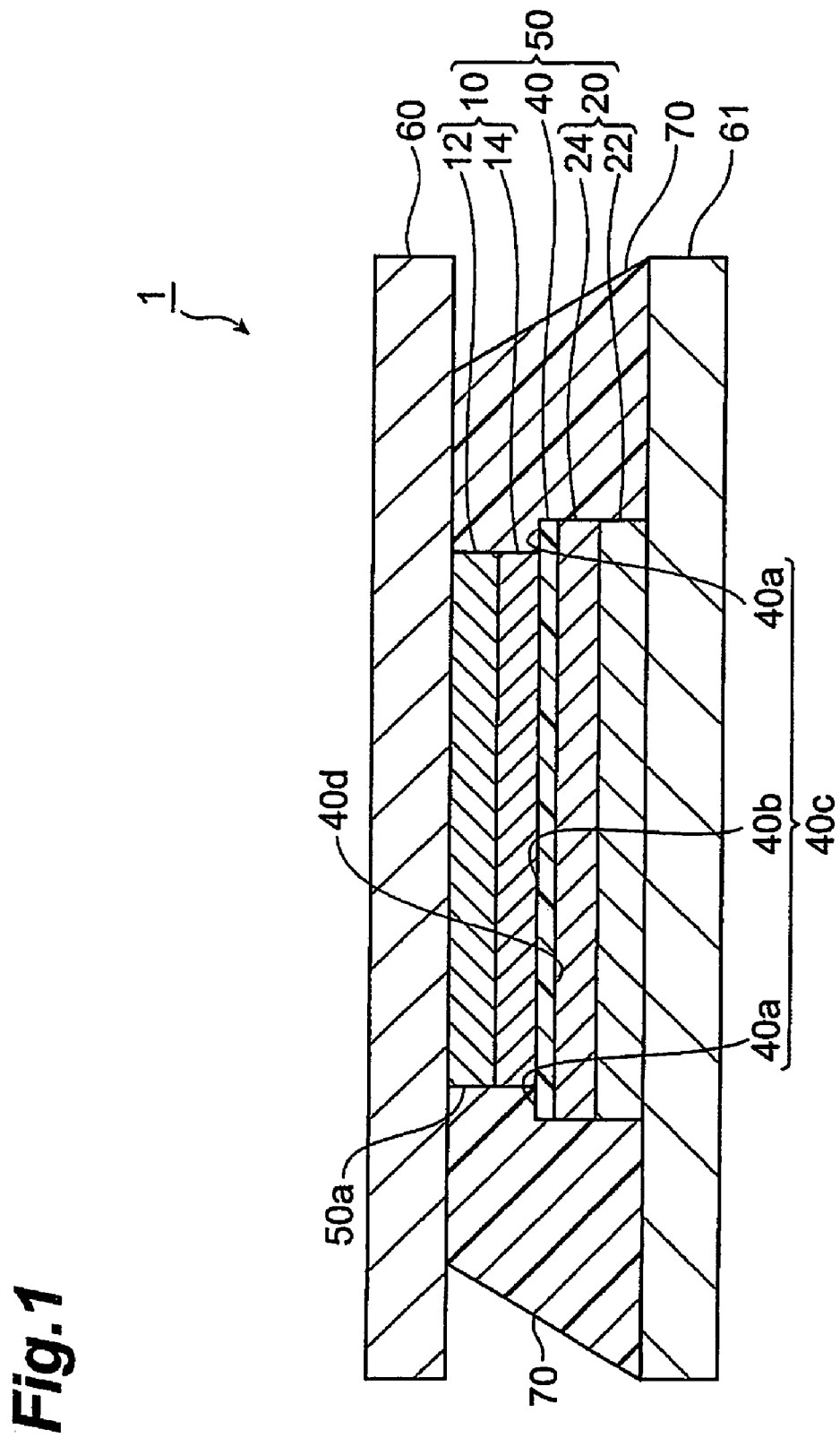
FIG. 1 is a sectional view of the electric double layer capacitor in accordance with a first embodiment of the present invention.
Figure 2:
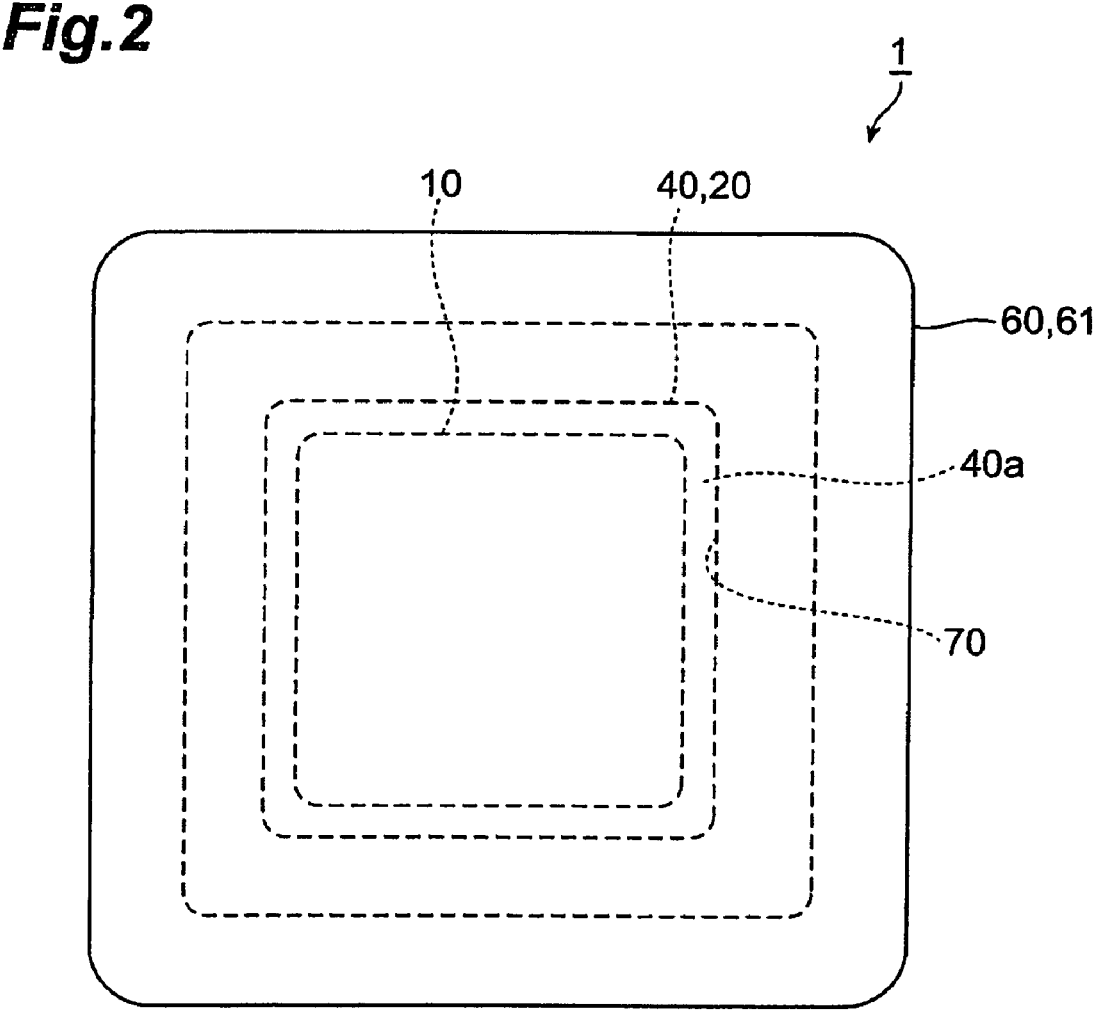
FIG. 2 is a top plan view of the electric double layer capacitor shown in FIG. 1.

FIG. 1 is a sectional view showing an electric double layer capacitor 1 as an electrochemical device in accordance with the first embodiment of the present invention, whereas FIG. 2 is a top plan view of FIG. 1.

The electric double layer capacitor 1 mainly comprises a planar laminate 50; terminal plates 60, 61 holding the laminate 50 therebetween from both sides in its thickness direction; and a resin part 70 sealing the outer periphery of the laminate 50 and bonding the terminal plates 60, 61 to each other.

The laminate comprises a cathode 20, a separator (separator layer) 40, and an anode 10 which are successively laminated from the lower side. Here, for convenience of explanation, the "anode" 10 and "cathode" 20 are determined according to polarities of the electric double layer capacitor 1 at the time of discharging.

The anode 10 is constituted by a planar collector layer 12 formed from an electronically conductive material, and an electronically conductive porous layer (second electrode) 14 formed on the collector layer 12.

As with the anode 10, the cathode 20 is constituted by a planar collector layer 22 formed from an electronically conductive material, and an electronically conductive porous layer (first electrode) 24 formed on the collector layer 22. Here, the porous layers 14 and 24 are in contact with the separator 40.

The collector layers 12 and 22 are not restricted in particular as long as they are conductors which can sufficiently transfer electric charges to the porous layers 14 and 24, whereby collector layers used in known electric double layer capacitors can be employed. Examples of the collector layers 12 and 22 include foils of metals such as aluminum. Each of the collector layers 12, 22 has a thickness of 15 to 20 µm, for example.

Constituent materials of the porous layers 14 and 24 are not restricted in particular, whereby the same materials as with those of polarizable electrodes such as carbon electrodes used in known electric double layer capacitors can be employed. For example, those whose constituent materials are mainly composed of carbon materials (e.g., activated carbon) obtained by activating coking coal (e.g., petroleum coke made by a delayed coker from material oils such as bottom oils of fluidized catalytic crackers for petroleum-based heavy oils and residual oils of vacuum distillers) can be used. Also, carbon materials such as carbon black, acetylene black, and powder graphite can be used. The other conditions (species and contents of constituent materials, such as a binder, other than the carbon materials) are not restricted in particular.

When a carbon powder is required to be provided with conductivity, for example, carbon black, acetylene black, powder graphite, or the like may be added thereto as a conductive auxiliary agent. For binding the porous layers 14 and 24 to the collector layers, a binder (such as PTFE, PVDF, PE, PP, or fluorine rubber), for example, may be added.

From the viewpoint of sufficiently securing a contact interface between the porous layer 14, 24 and an electrolytic solution, it will be preferred if the porous layers 14, 24 have a porosity of 0.5 to 0.75. Without being restricted in particular, known methods can determine the porosity of the porous layers 14, 24.

The separator 40 disposed between the anode 10 and cathode 20 is not restricted in particular as long as it is a porous body formed from an insulating material which transmits ions therethrough, whereby separators used in electrochemical devices such as known electric double layer capacitors can be employed. Examples of the separator material include laminates of films made of polyethylene, polypropylene, and polyolefin; extended films of mixtures of the resins mentioned above; and fibrous nonwoven fabrics constituted by at least one species of constituent materials selected from the group consisting of cellulose, polyester, and polypropylene.

Here, the area of the anode 10 is made smaller than each of the areas of the cathode 20 and separator 40. The cathode 20 and separator 40 have substantially the same area. The thickness of the separator 40 is 30 to 60 μm, for example. Each of the anode 10 and cathode 20 has a thickness of 20 to 60 μm, for example.

The porous layer 24 of the cathode 20 completely covers one face 40d of the separator 40. On the other hand, the porous layer 14 of the anode 10 covers only a center part 40b of the other face 40c of the separator 40. Therefore, a ring-like noncontact part 40a having a predetermined width is formed along the outer perimeter of the separator 40 on the other face 40c of the separator 40.

Pores of the porous layer 14 in the anode 10, the porous layer 24 in the cathode 20, and the separator 40 are impregnated with an electrolytic solution (not depicted).

The electrolytic solution is not restricted in particular, whereby electrolytic solutions (aqueous electrolytic solutions, and electrolytic solutions with organic solvents) employed in electrochemical devices such as known electric double layer capacitors can be used. Since electrochemically low decomposition voltages of aqueous electrolytic solutions limit the durable voltage of electric double layer capacitors to a low level, however, electrolytic solutions (nonaqueous electrolytic solutions) using organic solvents are preferred.

Though not restricted in particular, species of the electrolytic solution are chosen in view of the solubility of solute, the degree of dissociation, and the viscosity of liquid in general, whereby electrolytic solutions having a high conductivity and a high potential window (high decomposition start voltage) are desirable. Typical examples are those in which a quaternary ammonium salt such as tetraethylammonium tetrafluoroborate is dissolved in a solvent. Preferred as the solvent is a nonaqueous solvent adapted to impart conductivity. Also, a non-protonic polar organic solvent which does not decompose at a high operation voltage is desirable. Examples of such a solvent include carbonates such as ethylene carbonate (EC), propylene carbonate (PC), butylene carbonate, dimethyl carbonate (DMC), diethyl carbonate (DEC), and ethylmethyl carbonate; cyclic ethers such as tetrahydrofuran (THF) and 2-methyltetrahydrofuran; cyclic ethers such as 1,3-dioxolane and 4-methyldioxolane; lactones such as γ-butyrolactone; sulfolane; 3-methylsulfolane; dimethoxyethane; diethoxyethane; ethoxymethoxyethane; and ethyl diglyme.

Among them, ethylene carbonate (EC), propylene carbonate (PC), butylene carbonate, γ-butyrolactone, and sulfolane are preferred, and PC is more preferable. In this case, it is necessary to control the mingling moisture strictly.

The resin part 70 covers the outer periphery 50a of the laminate 50 so as to surround the laminate 50, thereby yielding a ring-like form. Here, the outer periphery 50a of the laminate 50 is the combination of respective outer peripheries of the anode 10, separator 40, and cathode 20. The resin part 70 is formed from a resin material and seals the outer periphery 50a of the laminate 50. The resin part 70 further covers the noncontact part 40a of the separator 40 and seals the noncontact part 40a.

The resin material of the resin part 70 is not restricted in particular as long as it is a material hard to transmit therethrough the electrolytic solution or vapors of its constituents. Thermoplastic resins are preferably used, since they are easy to form coatings. Preferably utilizable examples of the thermoplastic resin material include polypropylene and polyethylene. In particular, polypropylene is preferred from the viewpoint of adhesion to the terminal plate 60.

The outer periphery 70a of the resin part 70 is formed like a truncated cone whose outer diameter tapers down from the side of the cathode 20 having a larger area to the side of the anode 10 having a smaller area.

The terminal plates 60, 61 are plates formed from a conductive metal material such as nickel or aluminum, and hold the laminate 50 and resin part 70 therebetween in the laminating direction. One terminal plate 60 comes into contact with the collector layer 12, thereby electrically connecting with the porous layer 14. The other terminal plate 61 comes into contact with the collector layer 22, thereby electrically connecting with the porous layer 24. The terminal plates 60 and 61 are bonded to the upper and lower faces of the resin part 70, respectively.

Manufacturing Method

A method of making the electric double layer capacitor 1 (a preferred embodiment of the manufacturing method in accordance with the present invention) will now be explained.

Figure 3:
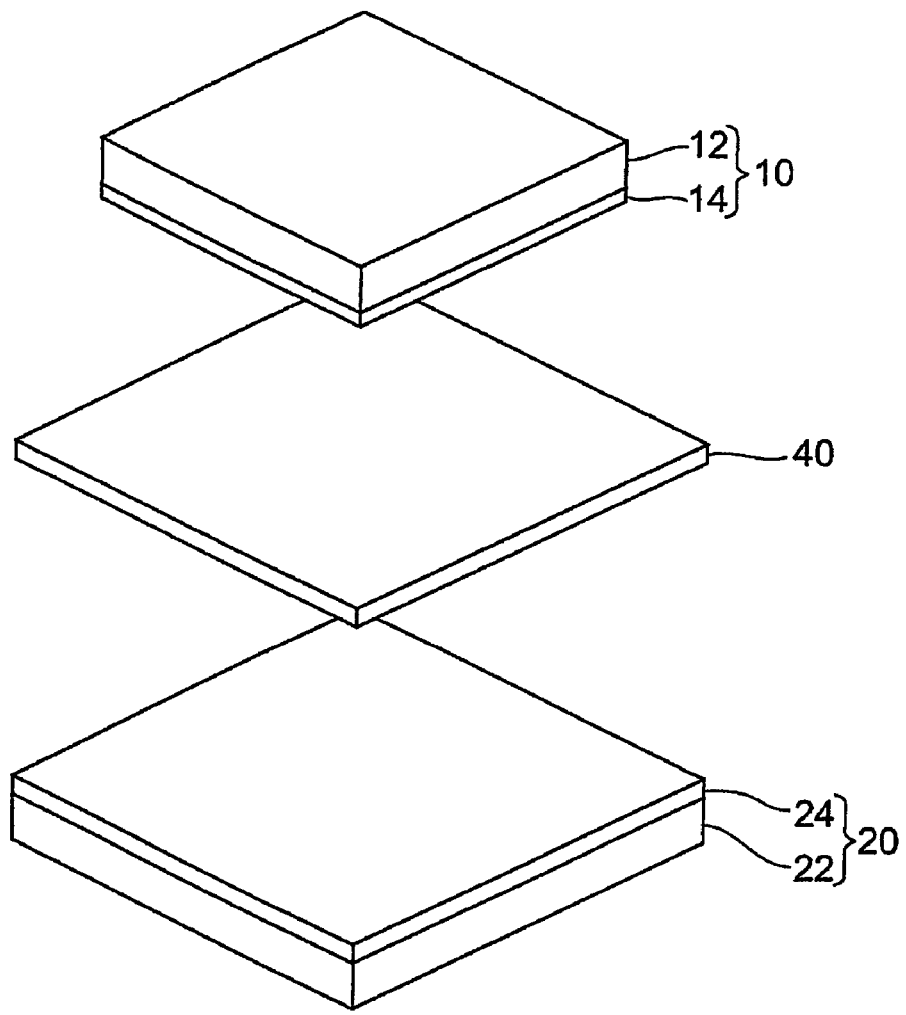
FIG. 3 is a perspective view for explaining a method of manufacturing the electric double layer capacitor shown in FIG. 1.

First, as shown in FIG. 3, an anode 10, a separator 40, and a cathode 20, each having a square form, for example, are prepared in order to produce a laminate 50.

Each of the anode 10 and cathode 20 can be formed by the steps of yielding an electrode sheet by applying a coating liquid for forming a porous body onto a metal foil and drying the liquid, and cutting the electrode sheet into a square having a desirable size. The coating liquid for forming the porous body can be obtained by a known method. For example, a carbon material is pulverized into particles having a size of about 5 to 100 μm and, after adjusting their granularity, is kneaded with a conductive auxiliary agent (carbon black or the like) for imparting conductivity to carbon powders and a binder (polyvinylidene fluoride which will hereinafter be referred to as PVdF) added thereto, whereby a coating liquid for forming a porous body is obtained. When cutting the sheet, the area of the anode 10 is made smaller than the area of the cathode 20.

The separator 40 can be formed by cutting out an insulating porous sheet such as a nonwoven fabric made of regenerated cellulose into a square. Here, the area of the separator 40 is made identical to the area of the cathode 20.

Figure 4:
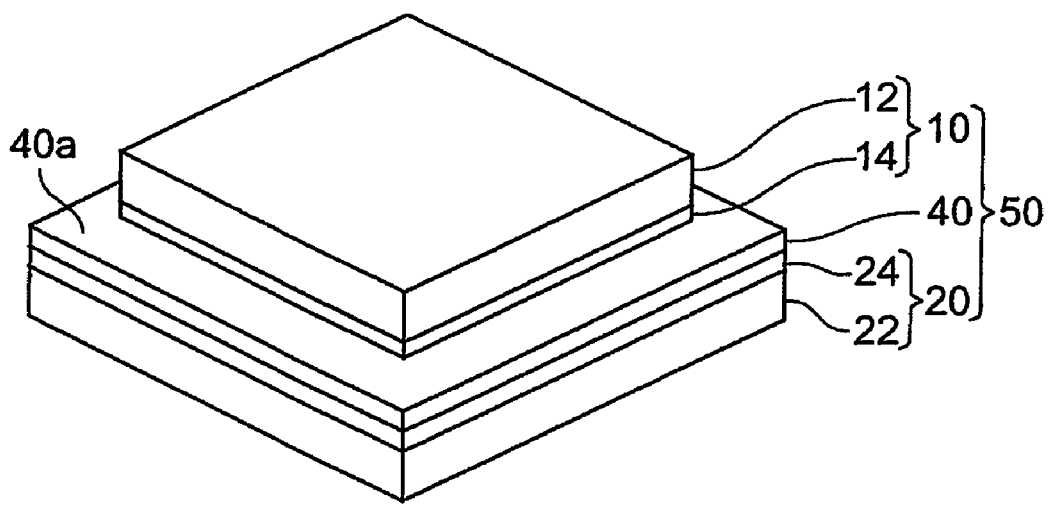
FIG. 4 is a perspective view, subsequent to FIG. 3, for explaining the method of manufacturing the electric double layer capacitor shown in FIG. 1.

Next, as shown in FIG. 4, the separator 40 is mounted on the cathode 20 so as to cover the whole upper face of the cathode 20, the anode 10 is mounted at a substantially center part on the separator 40, and they are thermally pressed from the upper and lower sides, whereby the laminate 50 is obtained. Here, a noncontact surface 40a kept away from the anode 10 is formed like a square ring along the outer periphery of the cathode 20 on the surface of the separator 40 opposing the anode 10.

Instead of forming the anode 10 and cathode 20 as a laminate beforehand, porous materials and collector materials formed into sheets by known methods may be cut out into predetermined squares and laminated into a structure of collector/porous body/separator/porous body/collector, so as to be integrated.

Subsequently, an electrolytic solution such as the one mentioned above is prepared, and the laminate 50 is impregnated therewith in vacuum. Thereafter, the excess of electrolytic solution is wiped away.

Figure 5:
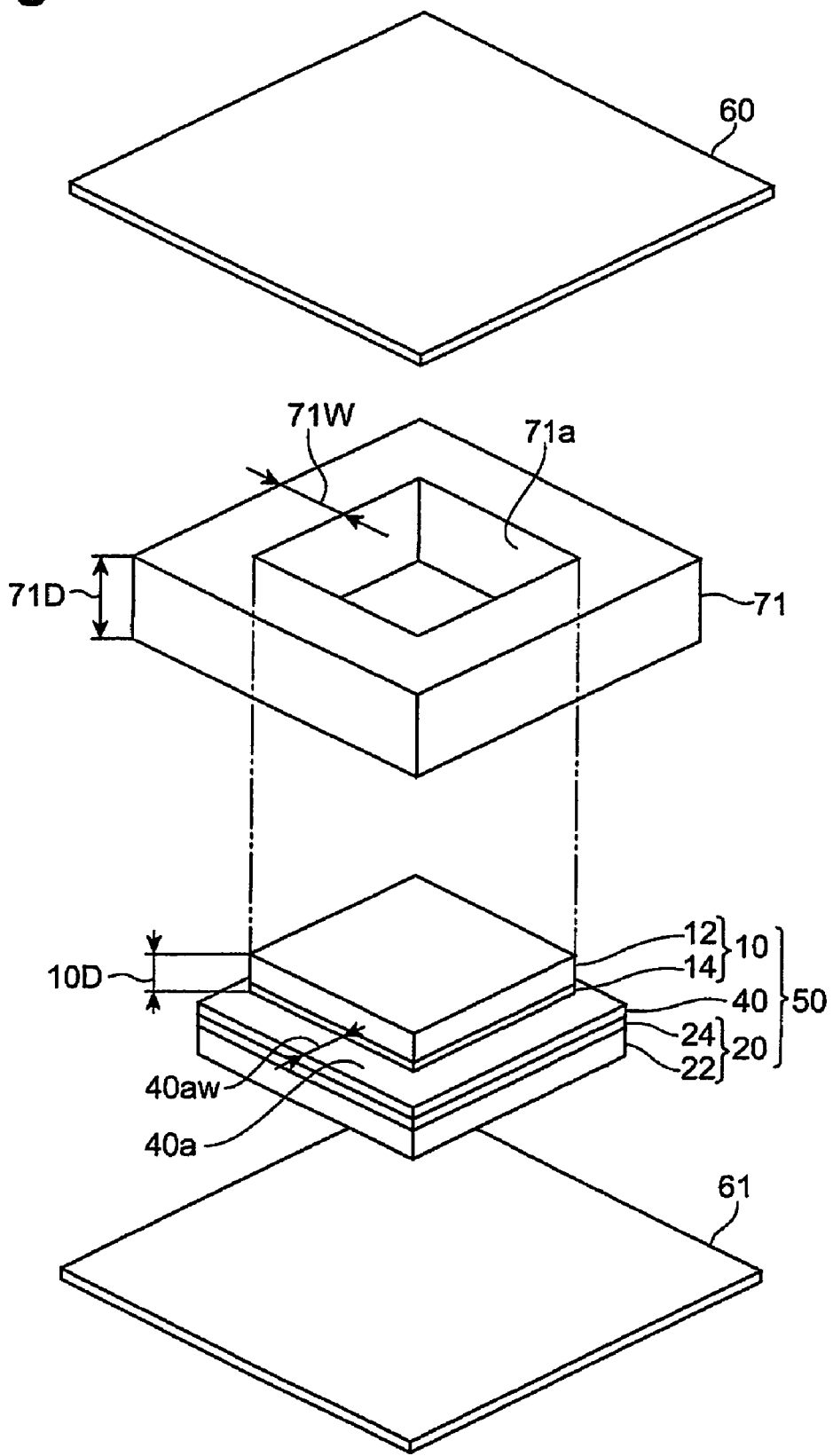
FIG. 5 is a perspective view, subsequent to FIG. 4, for explaining the method of manufacturing the electric double layer capacitor shown in FIG. 1.

Next, as shown in FIG. 5, a sealant 71 made of a thermoplastic resin is prepared. The sealant 71 is a square plate having front and rear faces with a through hole 71a penetrating therethrough, thus exhibiting a square ring form. The through hole 71a has a square cross section with an area substantially corresponding to the area of the anode 10, whereby the anode 10 can enter the through hole 71a but the separator 40 and cathode 20 cannot. The width 71W of the ring of the sealant 71 is made greater than the width 40aW of the noncontact part 40a, whereas the thickness 71D of the sealant 71 is made greater than the thickness 10D of the anode 10. Also, square terminal plates 60, 61 each having an area slightly greater than that of the cathode 20 are prepared.

Figure 6:
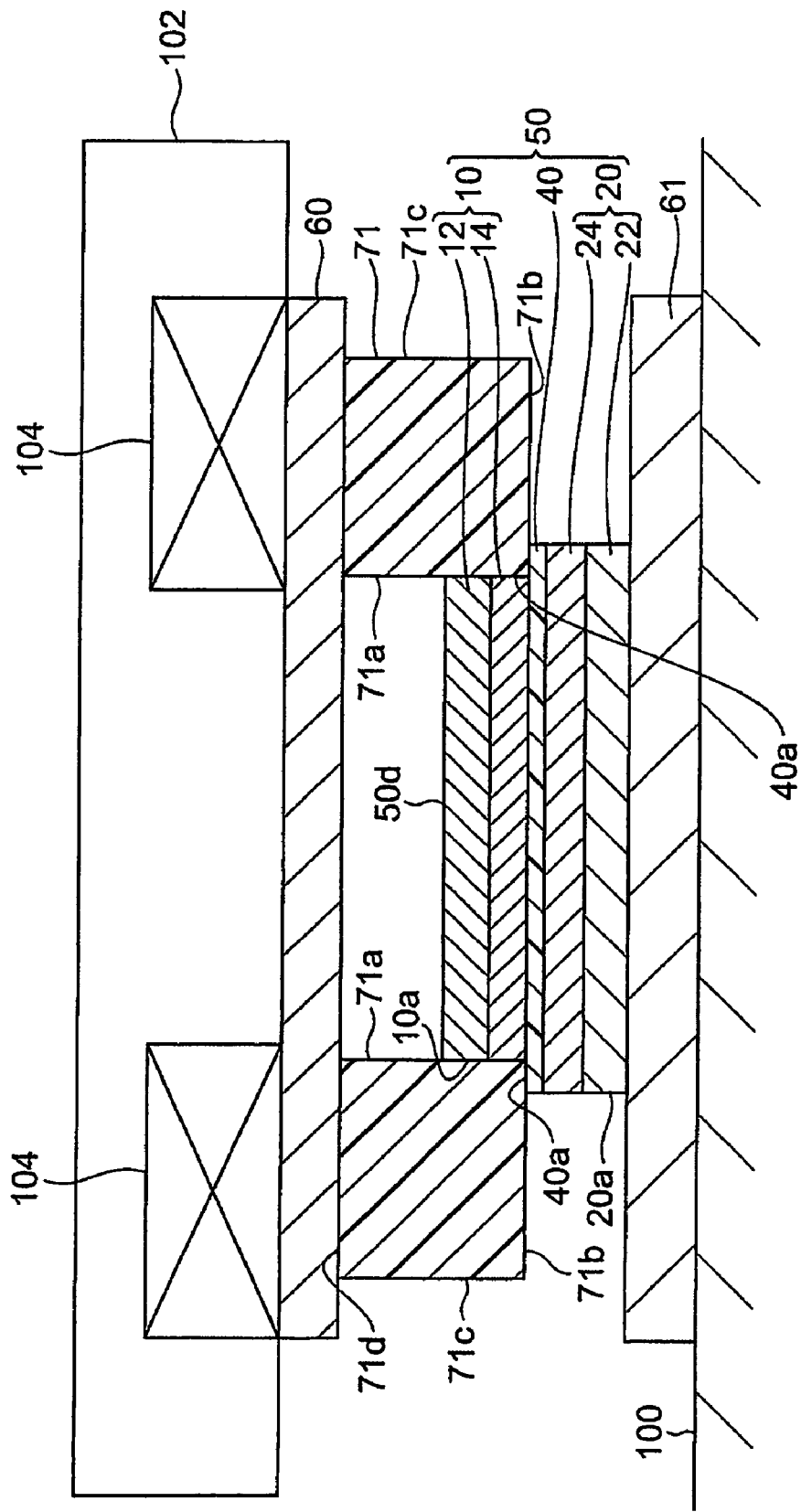
FIG. 6 is a schematic sectional view, subsequent to FIG. 5, for explaining the method of manufacturing the electric double layer capacitor shown in FIG. 1.

Then, as shown in FIG. 6, the terminal plate 61, laminate 50, sealant 71, and terminal plate 60 are laminated on a bed 100. Here, the sealant 71 is mounted such that the anode 10 of the laminate 50 enters the through hole 71a, whereas the bottom face 71b of the sealant 71 comes into contact with the noncontact part 40a of the separator 40. Here, the inner periphery 71a of the sealant 71 surrounds the outer periphery of the anode 10. The upper face 71d of the sealant 71 projects beyond the top face of the anode 10, i.e., the top face 50d of the laminate 50, whereas the outer periphery 71c of the sealant 71 projects out of the outer periphery 20a of the cathode 20 and separator 40. When the outer periphery 71c of the sealant 71 sufficiently projects, the resin part 70 formed by melting upon heating can attain a sufficient radial thickness.

Subsequently, a presser 102 presses the upper terminal plate 60 from the upper side toward the lower terminal plate 61 while heating the sealant 71. The presser 102 has a ring-shaped heater 104 corresponding to the ring-like form of the sealant 71, and concentrically heats the sealant 71 by way of the terminal plate 60. When the sealant 71 is polypropylene, the heating temperature may be 140° to 200° C. Such a low temperature hardly adversely affects the laminate 50.

When heated, the sealant 71 melts, so as to be fluidized, whereby the upper terminal plate 60 comes into contact with the collector layer 12 of the anode 10 as shown in FIG. 1. Then, the melted sealant 71 forms the resin part 70, adheres to and covers the outer periphery 50a of the laminate 50 and the noncontact part 40a of the separator 40, and adheres to the terminal plates 60, 61, thereby completing the electric double layer capacitor 1 of FIG. 1. The electric double layer capacitor 1 has a thickness of 70 to 90 μm, for example.

Since the area of the anode 10 is smaller than the area of the cathode 20, the electrode opposing area is kept at the area of the anode 10 in thus configured electric double layer capacitor 1 of this embodiment even when relative positions of the anode 10 and cathode 20 in the depicted horizontal direction slightly shift from each other in the manufacturing process. Therefore, fluctuations in capacity are reduced.

On the other hand, both of the outer periphery 50a of the laminate 50 and the noncontact part 40a of the separator 40 are covered and sealed with the resin part 70, whereby the electrolytic solution is hard to evaporate/disperse from the outer periphery 50a of the laminate 50 and, in particular, the noncontact part 40a of the separator 40 even when exposed to a high temperature, whereby heat resistance improves.

In this embodiment, the anode 10 and cathode 20 have the collector layers 12 and 22, respectively, which are covered with the resin part 70. Therefore, the porous layer 14, separator 40, and porous layer 24 containing the electrolytic solution are sealed with the resin part 70 and the collector layers 12, 22, so that the dissipation of the electrolytic solution upon evaporation is reduced, whereby heat resistance further improves.

Therefore, the electrochemical device can enhance its reliability in a high-temperature atmosphere, and can attain a sufficiently high reliability even after being exposed to a high temperature by surface mounting or the like.

In addition, since the outer periphery 50a of the laminate 50 is covered, no unnecessary space exists between the outer periphery 50a of the laminate 50 and the resin part 70, whereby the electric double layer capacitor 1 can reduce its volume in this embodiment. Also, since no unnecessary space exists, so-called dry-out in which the electrolytic solution is unevenly distributed into this space is hard to occur. Further, since only a minimum amount of the electrolytic solution is required to be stored in the porous body 14, separator 40, and porous body 24 within the laminate 50, the fear of liquid leakage is reduced.

Since the laminate 50 is held between the terminal plates 60, 61 whereas the space between fringes of the terminal plates 60, 61 is sealed with the resin part 70, the sealability of the electrolytic solution becomes higher, thereby improving heat resistance.

Since the resin part 70 also covers the noncontact part 40a of the separator 40, the bonding strength between the resin part 70 and laminate 50 increases, thereby improving the mechanical strength of the electric double layer capacitor 1.

Figure 7:
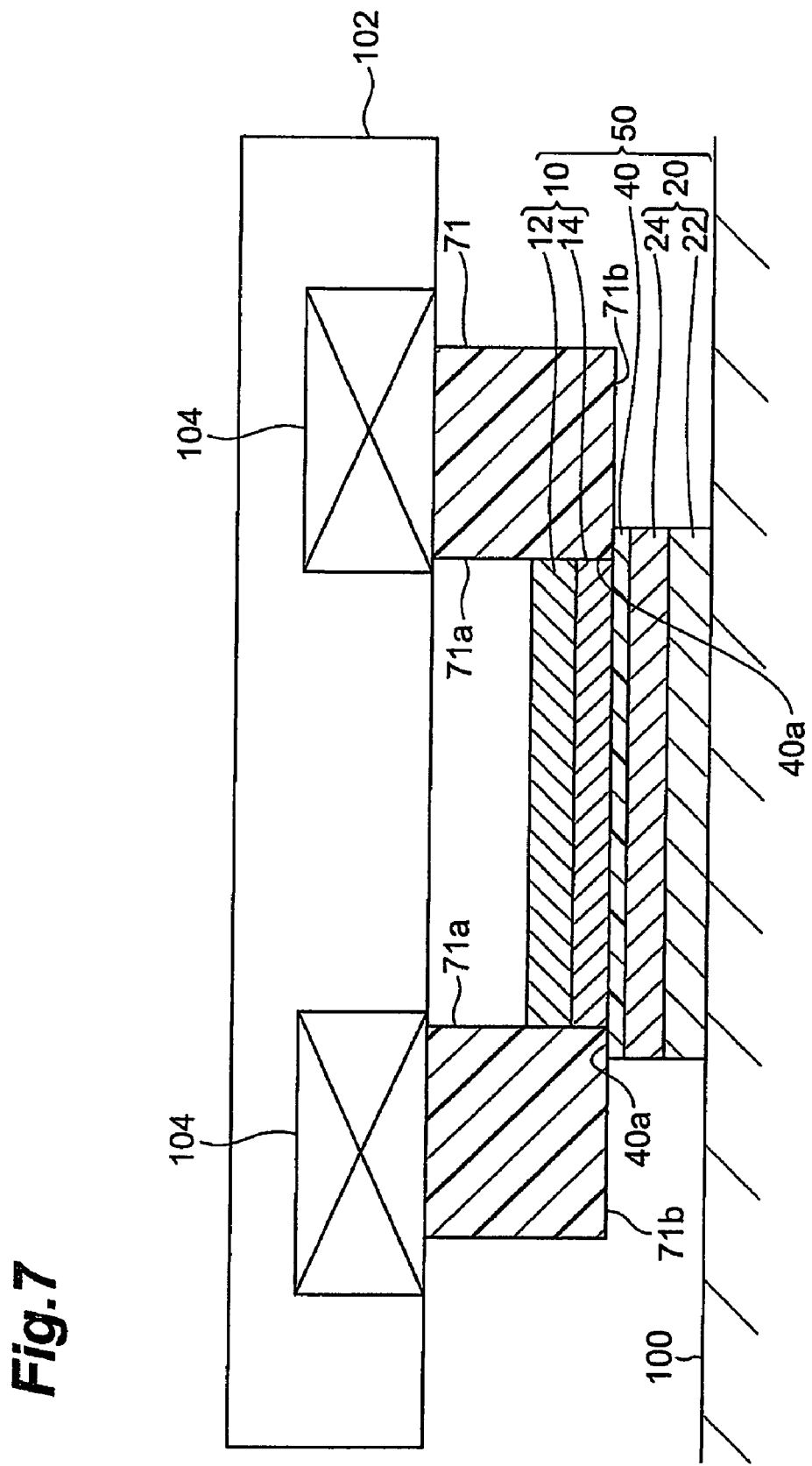
FIG. 7 is a schematic sectional view for explaining another method of manufacturing the electric double layer capacitor shown in FIG. 1.
Figure 8:
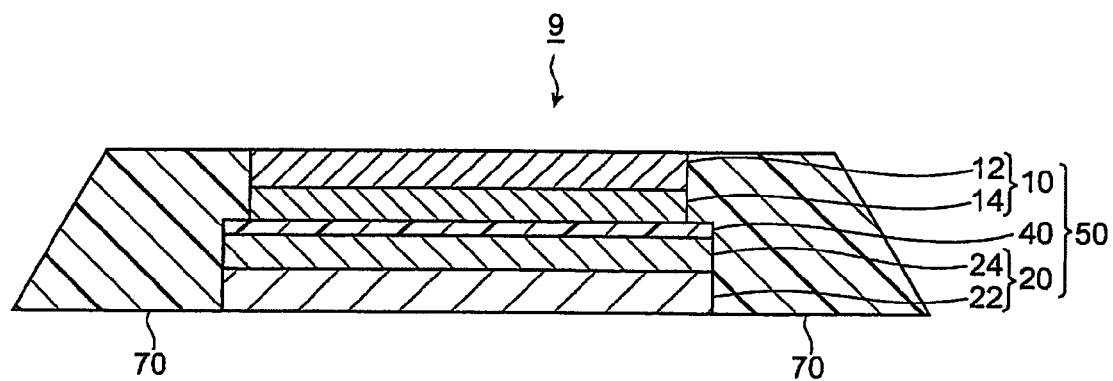
FIG. 8 is a sectional view, subsequent to FIG. 7, for explaining the method of manufacturing the electric double layer capacitor shown in FIG. 1.

Though the covering of the outer periphery 50a of the laminate 50 and the noncontact part 40a with the resin part 70 and the bonding of the terminal plates 60, 61 to the resin part 70 are performed at once in this embodiment in order to reduce the number of steps, they may be carried out separately. For example, as shown in FIG. 7, the sealant 71 may be melted while being pressed against the noncontact part 40a of the laminate 50 in a state where only the sealant 71 is mounted on the laminate 50, i.e., without the terminal plates 60, 61 interposed therebetween. This forms the resin part 70 at the outer periphery 50a of the laminate 50. Thus, a structure 9 having the laminate 50 and resin part 70 without the terminal plates 60, 61 may be made as shown in FIG. 8, and then the terminal plates 60, 61 may be thermally fused onto the upper and lower faces of the structure 9, respectively, so as to yield the electric double layer capacitor 1.

Second Embodiment

Figure 9:
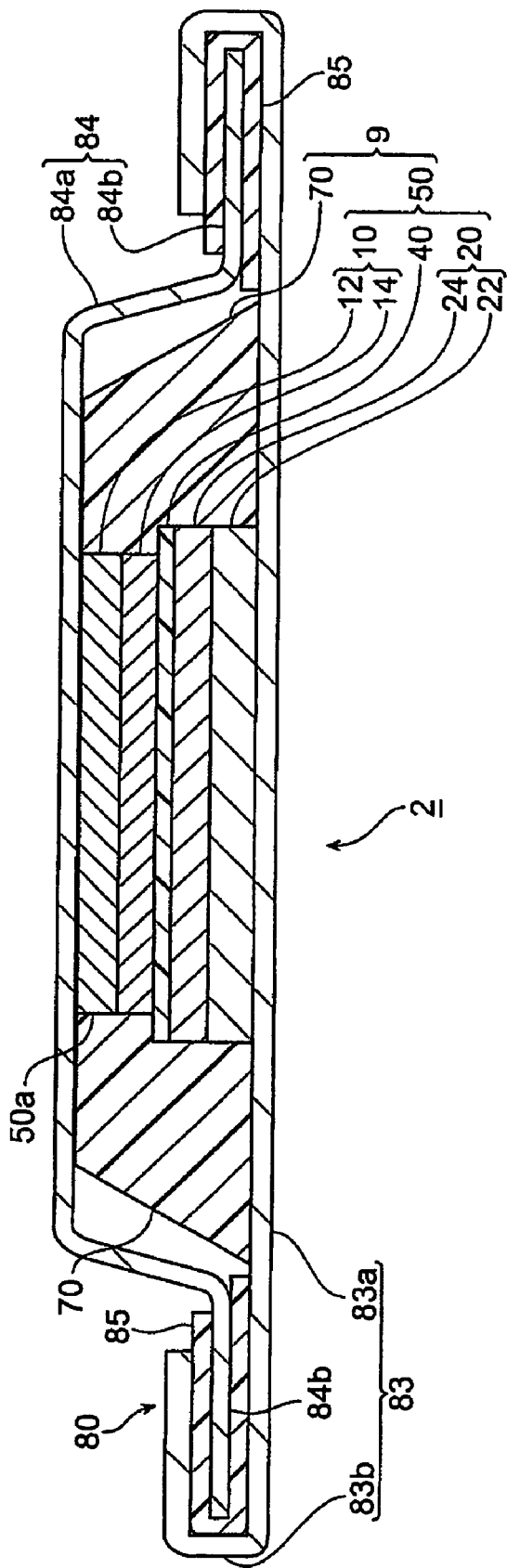
FIG. 9 is a sectional view of the electric double layer capacitor in accordance with a second embodiment of the present invention.

The electric double layer capacitor 2 in accordance with the second embodiment will now be explained with reference to FIG. 9.

The electric double layer capacitor 2 of this embodiment differs from the electric double layer capacitor 1 of the first embodiment in that it includes a can-like case (package) 80 while lacking the terminal plates 60, 61.

This electric double layer capacitor 2 is constituted by a structure 9 comprising a laminate 50 and a resin part 70 covering the outer periphery 50a of the laminate 50 and the noncontact part 40a, and a case 80 accommodating the structure 9 in a closed state. Here, the structure 9 can be manufactured by the method explained in the latter half of the first embodiment.

The case 80 is a container which closes the structure 9 by holding it from the upper and lower sides, and comprises an upper lid 84, a lower lid 83, and a gasket 85 for electrically insulating the lower lid 83 and upper lid 84 from each other.

The upper lid 84 is formed from a metal foil such as aluminum. The upper lid 84 comprises a cylindrical part 84a having a closed upper end and an open lower end, and a brim 84b projecting out from the lower end of the cylindrical part 84a. The top portion of the cylindrical part 84a of the upper lid 84 is in contact with the collector layer 12.

The lower lid 83 is formed from a foil of a metal such as aluminum; and comprises a planar center part 83a covering the opening of the upper lid 84 and being in contact with the collector layer 22, and a crimping part 83b, disposed along the periphery of the center part 83a, holding the brim 84b of the upper lid 84 from the upper and lower sides.

Specifically, the crimping part 83b of the lower lid 83 extends outward along the depicted lower face of the brim 84b of the upper lid 84 while the insulative gasket 85 is interposed therebetween, and is bent upward at the outer end of the brim 84b so as to extend inward along the upper face of the brim 84b. The crimping part 83b crimps the brim 84b so as to hold it from the upper and lower sides while the gasket 85 is interposed therebetween. Thus, the structure 9 is sealed within the case 80 formed by the lower lid 83 and upper lid 84.

For such a gasket 85, a resin adapted to bond with a metal can be utilized. Preferred examples of the resin include acid-denatured polypropylene and acid-denatured polyethylene. When such a resin adapted to bond with a metal by heating is used as the gasket 85, the gasket 85 can easily bond the lower lid 83 and upper lid 84 to each other when being heated from the outside after the crimping part 83b of the lower lid 83 crimps the brim 84b of the upper lid 84 while the gasket 85 is interposed therebetween. An adhesive such as epoxy resin may be used so as to perform crimping and bonding at the same time.

The same operations and effects as those of the first embodiment can also be obtained in this embodiment, since the structure 9 is the same as that of the first embodiment. Since the structure 9 is further closed by the case 80, the total sealability becomes higher. The outer periphery 70a of the resin part 70 is formed like a truncated cone whose outer diameter tapers down from the side of the cathode 20 having a larger area to the side of the anode 10 having a smaller area. Therefore, the structure 9 is harder to shift its position unnecessarily within the case 80.

Third Embodiment

Next, the electric double layer capacitor 3 in accordance with the third embodiment will be explained with reference to FIGS. 10 and 11.

The electric double layer capacitor 3 in accordance with this embodiment differs from the electric double layer capacitor 1 in accordance with the first embodiment in that it includes a bag-shaped can-like case (package) 90 formed from a flexible film 91 in which a metal foil is laminated with a resin and that the terminal plates 60, 61 are provided with leads 60a, 61a which project out of the case 90.

Figure 10:
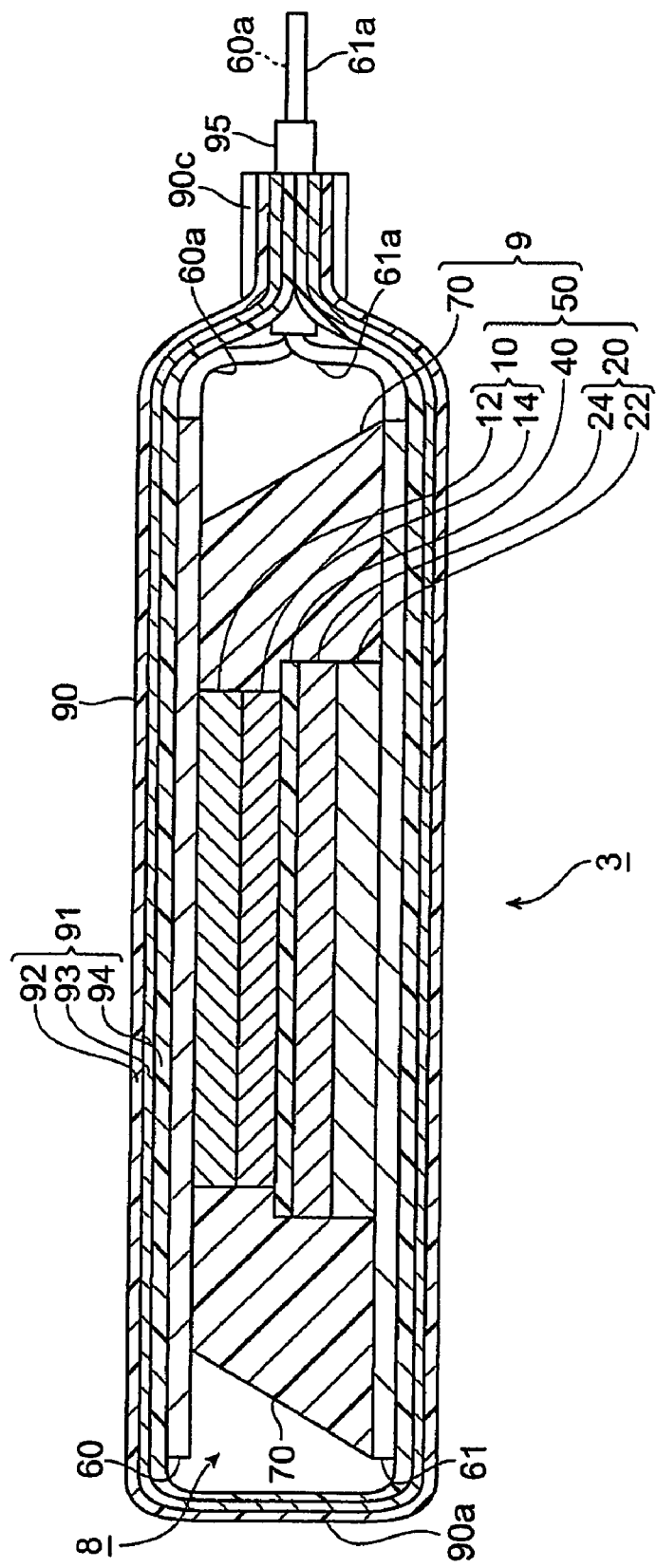
FIG. 10 is a sectional view of the electric double layer capacitor in accordance with a third embodiment of the present invention.
Figure 11:
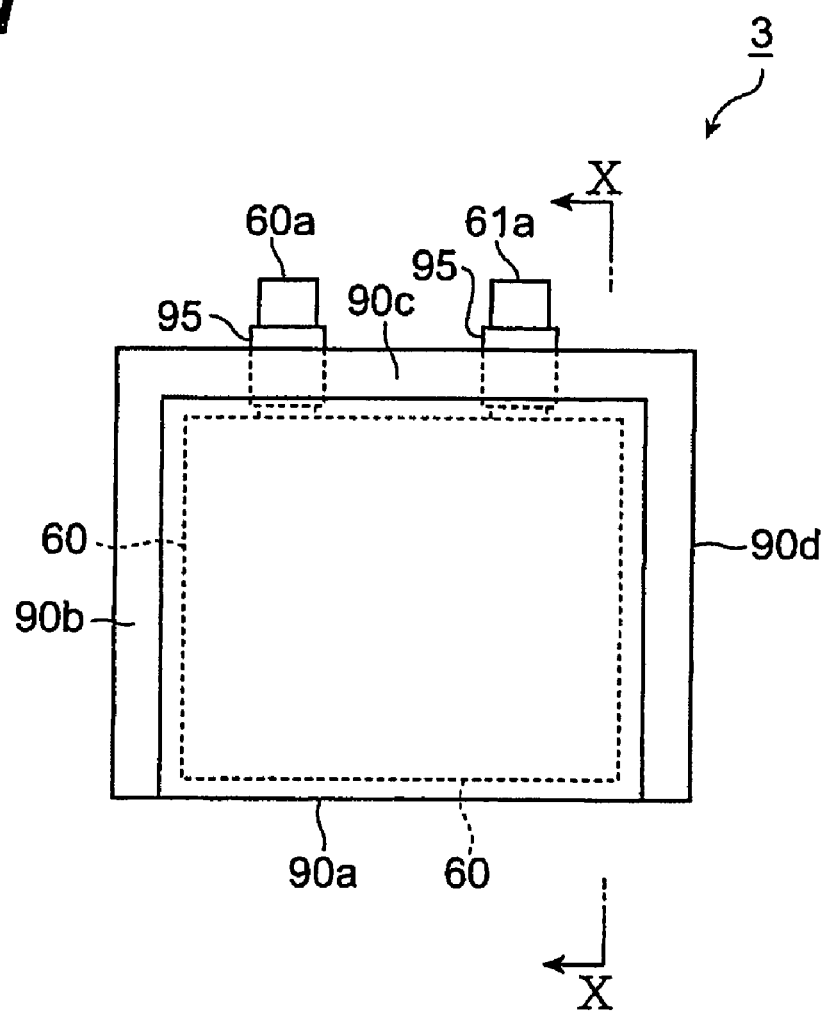
FIG. 11 is a plan view of the electric double layer capacitor shown in FIG. 10.

As shown in FIG. 10, the film 91 of the case 90 is a metal laminate including a metal layer 93 and resin layers 92, 94 holding the metal layer 93 therebetween. Preferably, the metal layer 93 is formed from a metal having a high gas barrier property such as aluminum or titanium. Preferably, the resin layer 92 exposed to the outside is formed from an electrically insulating resin. The resin layer 94 forming the inner side face of the case 90 is formed from a thermally fusible thermobonding resin.

For example, an aluminum laminate whose resin layer 92/metal layer 93/resin layer 94 are nylon/aluminum/polypropylene (PP) is preferable as the film 91 forming the case 90, whereas these three layers have typical thicknesses of 30 μm, 20 μm, and 25 μm, respectively.

The case 90 is formed by folding the rectangular film 91 at the longitudinal center 90a thereof, and thermally fusing seal parts 90b, 90c, 90d of three sides.

The case 90 accommodates a structure 8. The structure 8 comprises a structure 9 including a laminate 50 and a resin part 70, and terminal plates 60, 61 disposed at the upper and lower faces of the structure 9 as in the first embodiment.

At end parts, the terminal plates 60, 61 have leads 60a, 61a formed like ribbons, which are separated from each other and project out of one seal part 90c of the case 90. In the seal part 90c, the leads 60a, 61a are coated with respective covers 95 made of a resin, whereby the sealability of the case 90 is improved.

The same operations and effects as those of the first embodiment can also be obtained in this embodiment, since the structure 9 is the same as that of the first embodiment. Since the structure 9 is further closed in the case 80, the total sealability becomes higher.

Though preferred embodiments of the present invention are explained in detail in the foregoing, the present invention is not restricted thereto.

For example, though the area of the anode 10 is made smaller than each of the areas of the cathode 20 and separator 40 in the above-mentioned embodiment, the area of the cathode 20 may be made smaller than each of the areas of the anode 10 and separator 40. In any of these combinations, the structure 8 is less likely to shift its position unnecessarily within the case 90 when the outer periphery 70a of the resin part 70 is formed like a truncated cone.

Though each of the anode 10, cathode 20, and separator 40 has a square form in the above-mentioned embodiments, they may have circular or rectangular forms, for example.

Though a single laminate 50 is provided in the explanation of the above-mentioned embodiments, a plurality of laminates 50 may be laminated.

Though the above-mentioned embodiments mainly relate to configurations preferred when the present invention is employed in an electric double layer capacitor, the electrochemical device of the present invention is not restricted to the electric double layer capacitor but is applicable to electrochemical devices such as pseudocapacitors and redox capacitors, for example.

Though the above-mentioned embodiments mainly relate to configurations preferred when the present invention is employed in an electrochemical capacitor (an electric double layer capacitor in particular), the electrochemical device of the present invention is not restricted thereto but is applicable to secondary batteries such as lithium-ion secondary batteries. In this case, a porous body to become a first electrode contains an electrode active material usable in anodes of secondary batteries such as lithium-ion secondary batteries. On the other hand, a porous body to become a second electrode contains an electrode active material usable in cathodes of secondary batteries such as lithium-ion secondary batteries.

Though the sealant 71 made of a resin is melted, so as to cover the outer periphery 50*a* of the laminate 50 and the noncontact part 40*a* with the resin in the above-mentioned embodiments, this is not restrictive. A sealer made of a liquid-like resin or the like may be applied onto the outer periphery 50*a* of the laminate 50 and the noncontact part 40*a*.

The electric double layer capacitor of the present invention will now be explained in detail with reference to Examples and Comparative Examples, though these examples do not restrict the present invention at all.

EXAMPLE 1

In the following procedure, an electric double layer capacitor having the same configuration as with the electric double layer capacitor 1 of FIG. 1 was made.

An anode 10 and a cathode 20 were made in the following manner. First, a carbon material (acetylene black, product name "DENKABLACK" manufactured by Denki Kagaku Kogyo K.K.) and a binder (fluorine rubber, product name "Viton-GF" manufactured by DuPont) were compounded such that the mass ratio of carbon material/binder=70:30, and the resulting mixture was put into MIBK (methylisobutylketone) acting as a solvent and kneaded therewith, whereby an electrode forming coating liquid (hereinafter referred to as "coating liquid L1") was prepared.

Next, a collector sheet (having a thickness of 20 μm) made of an aluminum foil was prepared. Subsequently, the coating liquid L1 was uniformly applied onto one face of the collector sheet.

Thereafter, MIBK is removed from the coating by drying. The resulting laminate constituted by the collector layer and dried coating was pressed with pressure rolls, so as to make an electrode sheet in which one face of the collector sheet is formed with an electronically conductive porous layer 14, 24 (having a thickness of 5 μm).

Subsequently, this electrode sheet was dried in vacuum for 12 hr or more at a temperature of 150° to 175° C., so as to eliminate the moisture absorbed by the surface. Thereafter, in a dry room, the electrode sheet and a regenerated cellulose nonwoven fabric (having a thickness of 0.05 mm, product name "TF4050" manufactured by Nippon Kodoshi Corporation) acting as a separator were overlaid on each other such that the electrode surface of the electrode sheet came into contact with the separator, and they were integrated to each other by heat press (200° C.). Thus integrated laminate was cut into a square of 7.2×7.2 mm, so as to yield a laminate of the cathode 20 and separator 40.

On the other hand, an electrode sheet having eliminated its moisture was cut into a square of 7.1×7.1 mm, so as to yield the anode 10. The anode 10 and the laminate were arranged such that the electrode surface of the former came into contact with the separator 40 of the latter, and were heat-pressed (200° C.), so as to make a laminate 50. Here, a ring-like noncontact part 40*a* was formed on the separator 40.

Subsequently, the laminate 50 was dipped in an electrolytic solution (a propylene carbonate solution containing 1.8 mol/L of triethylmethylammonium tetrafluoroborate) in a vacuum case, and then the excess of electrolytic solution in marginal parts was wiped away.

Next, an aluminum foil having a thickness of 0.02 mm was cut into a square of 9.5×9.5 mm, so as to yield terminal plates 60, 61.

On the other hand, a through hole having a square cross section of 7.15×7.15 mm was formed at the center of a polypropylene sheet formed into a square of 9.3×9.3 mm having a thickness of 0.10 mm, so as to form a sealant 71.

Then, the laminate 50, sealant 71, and terminal plate 61 were mounted on the terminal plate 60 and pressed from the upper side while being heated, so as to melt the sealant 71, thereby covering end faces of the laminate 50 and the noncontact part 40*a*, so as to form a resin part 70, thus yielding an electric double layer capacitor.

EXAMPLE 2

The electric double layer capacitor of Example 2 was obtained as in Example 1 except that each of the cathode 20 and separator 40 had an area of 20×25 mm, and that the anode 10 had an area of 19.5×24.5 mm.

COMPARATIVE EXAMPLE 1

After the same laminate 50 as that of Example 1 was obtained, it was held between a pair of terminal plates each having an area sufficiently greater than that of the laminate 50 without forming the resin part 70, and the gap between fringes of the terminal plates was filled with a resin, so as to form a sealing layer, thereby sealing the laminate 50. Here, the outer periphery 50*a* of the laminate 50 and the sealing layer were kept away from each other.

COMPARATIVE EXAMPLE 2

The electric double layer capacitor of Comparative Example 2 was obtained as in Comparative Example 1 except that each of the cathode 20 and separator 40 had an area of 20×25 mm, and that the anode 10 had an area of 19.5×24.5 mm.

In each of the electric double layer capacitors of Examples 1 and 2 and Comparative Examples 1 and 2, the internal resistance (impedance) was measured at a frequency of 1 kHz with Solartron (product name, manufactured by TOYO Corporation) at a measurement environment temperature of 25° C. and a relative humidity of 60%.

FIG. 12 shows changes of the internal resistance value (impedance) in each of the electric double layer capacitors in accordance with Examples 1 and 2 and Comparative Examples 1 and 2 with time.

The impedance was hard to rise in the electric double layer capacitors of Examples 1 and 2 even when time passed, but was easy to rise with time in the electric double layer capacitors of Comparative Examples 1 and 2.

What is claimed is:

1. An electrochemical device comprising:
    a laminate including a first electrode layer, a separator layer, and a second electrode layer laminated in sequence;

an electrolytic solution infiltrating the laminate; and
a resin part covering an outer periphery of the laminate;
wherein the second electrode layer has an area smaller than the area of the separator layer and the area of the first electrode layer;
wherein the surface of the separator layer opposing the second electrode layer is provided with a noncontact part kept away from the second electrode layer;
wherein the noncontact part is formed like a ring along the outer periphery of the separator layer; and
wherein the resin part further covers the noncontact part of the separator layer.

2. An electrochemical device according to claim 1, wherein each of the first and second electrode layers is a polarizable electrode layer.

3. An electrochemical device according to claim 1, wherein the laminate is constructed by successively laminating a collector layer, the first electrode layer, the separator layer, the second electrode layer, and a collector layer.

4. An electrochemical device according to claim 1, further comprising a pair of terminal plates holding therebetween the laminate and the resin part in a laminating direction of the laminate, one terminal plate being electrically connected to the first electrode layer and bonded to the resin part, the other terminal plate being electrically connected to the second electrode layer and bonded to the resin part.

5. An electrochemical device according to claim 1, further comprising a can accommodating the laminate and resin part in a closed state, the can including two members made of a metal electrically insulated from each other, one member being electrically connected to the first electrode layer, the other member being electrically connected to the second electrode layer.

6. An electrochemical device according to claim 1, further comprising:
a bag accommodating the laminate and resin part in a closed state;
a first lead, electrically connected to the first electrode layer of the laminate, projecting out from within the bag; and
a second lead, electrically connected to the second electrode layer of the laminate, projecting out from within the bag;
wherein the bag is formed from a film constituted by a metal foil having a surface laminated with a resin.

7. An electrochemical device according to claim 1, wherein the resin part is formed from a thermoplastic resin.

* * * * *